3,557,009
NONHAZARDOUS POLYMERIZATION INITIATORS
Chester M. McCloskey, Altadena, Calif., Donald E. Rees, Midland Park, N.J., and George Hoff, Glendora, Calif., assignors to The Norac Company, Inc., Azusa, Calif., a corporation of California
No Drawing. Filed May 15, 1967, Ser. No. 638,643
Int. Cl. C08f 1/60
U.S. Cl. 252—186
8 Claims

ABSTRACT OF THE DISCLOSURE

Alcohols boiling between 130–255° C. are disclosed as effective phlegmatizers in suppressing the explosive decomposition of ketone peroxides due to heating.

---

This invention relates to new nonhazardous polymerization initiator compositions.

It is an object of this invention to provide ketone peroxide compositions that are free from the explosive decomposition that ketone peroxides normally exhibit when heated to high temperatures.

It is another object of this invention to provide ketone peroxide compositions that have good storage stability, and are efficient initiators for the polymerization of ethylenically unsaturated compounds.

Ketone peroxides are used extensively for the initiation of polymerization of ethylenically unsaturated compounds and their use is well known in the art. While thermal initiation is often employed they have found their most extensive use in the so called room temperature polymerizations employing a soluble sicative metal salt such as cobalt octoate, with the "unsaturated polyester resin." These resins are composed of an unsaturated alkyd resin dissolved in a monomer such as styrene or methyl methacrylate.

A wide range of ketone peroxides have been employed but the most common ones have been prepared from methyl ethyl ketone, cyclohexanone and methyl amyl ketone. The hazardous nature of organic peroxides in general and ketone peroxides in particular is well known in the art. The ketone peroxides prepared from the higher molecular weight ketone such as methyl amyl ketone, in which the active oxygen content is lower, do not require diluents in order to be handled with reasonable safety. The peroxides prepared from the lower molecular weight ketones in which the active oxygen content is higher require diluents for safe handling. The most commonly employed diluents are dimethyl phthalate and dibutyl phthalate. The active oxygen concentration is usually adjusted to around 11%. While these diluents provide reasonable safety for ordinary handling, even materials diluted to 11% active oxygen concentration may decompose explosively when held at high temperatures for a prolonged period of time.

The ketone peroxide in widest general use at the present time is methyl ethyl ketone peroxide. The commercial material is commonly marked as a 60% solution in dimethyl phthalate with an active oxygen concentration of 11%. Cyclohexanone peroxide is marketed as an 85% paste or moist solid with dibutyl phthalate as the diluent and an active oxygen concentration of 11%. Cyclohexanone peroxide is also marketed as a solution in combination with methyl ethyl ketone peroxide employing dimethyl phthalate as the diluent at an active oxygen concentration of 11%.

A composition can be obtained by sufficient dilution of the ketone peroxide with dimethyl phthalate that does not exhibit explosive decomposition even when boiled to dryness. The dilute solutions however have not found general acceptance because of the added expense of the diluent, the resulting higher freight and container cost and the desire to minimize the amount of inactive diluent in many formulations.

The term "nonhazardous" as used herein encompasses primarily suppression of the rapid decomposition exhibited by ketone peroxides when heated to high temperatures which results in explosions or detonations even when unconfined. It is understood that some of the compositions that are "nonhazardous" by this definition may burn readily or even accelerate during burning as do most organic peroxides.

The term "phlegmatizer" is used in explosive technology to describe materials or compounds that desensitize or stabilize. While the diluents commonly employed with ketone peroxides can properly be classed as phlegmatizers for simplification, the term is reserved herein to refer exclusively to the suppression of the explosive decomposition of these materials.

The term "ketone peroxide" as used herein is used in the common sense and refers to the monomers or open chain polymers of the hydroxy-hydroperoxides or dihydroxy peroxides which are formed from ketones and hydrogen peroxides and which are in general commercial use. It is not intended to include the cyclic-polymeric ketone peroxides which do not readily undergo redox decomposition with soluble salts of sicative metals which do not have general application as polymerization initiators and in many cases are highly explosive in nature. In addition to the ketone peroxide and diluent, small amounts of water and hydrogen peroxide are often present.

It has been discovered in accordance with the present invention that alcohols are effective phlegmatizers or desensitizer for ketone peroxides and suppress the rapid accelerating decomposition that results in explosions when these peroxides are heated to high temperatures. It has been further discovered that not all alcohols are active and that the effectiveness of the alcohol is related to the boiling point. Thus relatively small concentrations of an alcohol with a boiling point in the optimum part of the range is effective while much larger concentrations are required with alcohols boiling near the edges of the range.

The alcohols were found to be effective in suppressing explosive decomposition even in low concentrations was rather surprising since water not only is ineffective in small concentrations but in some instances increases the violence of the decomposition. Hydrogen peroxide likewise was found to increase the violence of the decomposition.

Nonflammability of the diluent is not a major factor in suppressing explosive decomposition since highly halogenated compounds were not observed to contribute to the explosive stability of ketone peroxide systems.

Ethers were not found to be effective. The only compounds in both groups that exhibited any stabilizing action at all boiled in the 170°–175° C. range further substantiating the importance of the boiling point.

The alkoxy- or alkylpolyoxyethylene alcohols are less efficient than the aliphatic alcohols, but the ketoalcohols are highly efficient in suppressing explosive decomposition.

Alcohols boiling in the range of 130–255° C. are effective in suppressing explosive decomposition but the range 140–205° C. is particularly effective with an optimum effectiveness between 150–190° C. The loss of activity of an alcohol falls off quite rapidly at the lower boiling point range but diminishes slowly at the higher boiling point range. There is some variations in phlegmatizing activity with structure but it is not a major factor compared to the boiling point of the alcohol.

As stated before the requirements for a "nonhazardous" composition depend on three parameters; the concentration of the ketone peroxide, the concentration of the alcohol and the boiling point of the alcohol. Thus in the edges of the effective boiling point range all of the diluent would be alcohol in order to give a nonhazardous composition at an active oxygen concentration of 11% while in the optimum part of the range an alcohol concentration of only 10% of the total composition is effective at the same active oxygen content. On the other hand employing such an alcohol as the entire diluent the active oxygen concentration can be increased above 11% to 14½%.

Alcohols boiling in the 130–255° range are effective phlegmatizers with ketone peroxide compositions containing hydrogen peroxide even though hydrogen peroxide increases the violence of decomposition of ketone peroxide compositions employing dimethyl phthalate alone as the diluent.

A considerable range of hydrogen peroxide concentrations can be employed safely but is limited due to the adverse effect of large concentration on the efficiency of the composition as a polymerization initiator.

The storage stability of ketone peroxide compositions containing alcohols varies depending on the structure of the particular alcohol employed but are comparable to those in commercial use.

The influence of the alcohol on the effectiveness of the compositions as polymerization initiators varies with the resin or monomer employed and the promotor and inhibitor system they contain. These are variations that are well understood in the art and exist in current commercial formulations.

EXAMPLE 1

The typical "unsaturated polyester resin," or, *polyester resin*, as they are commonly called in the trade, used in the following examples was prepared as follows: 65 parts alkyd resin, acid No. 45–50 prepared from 1 mole maleic anhydride, 1 mole phthalic anhydride and 2.2 moles propylene glycol, plus 35 parts styrene, 0.13 part hydroquinone and 0.03 part of cobalt as cobalt octoate.

EXAMPLE 2

The term PVT Test in the examples, refers to a pressure vessel test developed in Holland by Dr. E. W. Lindeijer at the Technological Laboratory of the National Defense Research Organization and work with it in this country is described by O. T. Mageli et al. Ind. Eng. Chem. 56, 18 (1964). It consists essentially of a pressure vessel into which a sample is placed in a standard metal cup. On top is fitted a burst diaphragm calibrated for 100 p.s.i. On the side is a fitting into which discs having varying apertures can be inserted. Using a standard heating rate, the smallest aperture that can be tolerated without rupture of the burst diaphragm is determined for a given compound. The smaller the aperture the less hazardous the compound.

EXAMPLE 3

The TCT Test in the following examples refers to a test developed by Mr. Howard Greer of Bel Air, Texas. It consists essentially of placing 100 ml. of the composition to be tested in a steel can similar to those used for frozen juice, inserting a 250-watt immersion heater, and observing the results of heating to destruction. The sample may boil to dryness, catch fire, pop, or explode violently depending on the composition. The can may be left standing intact or in violent explosion, completely disintegrate. It has been found to be at least as reproducible as the PVT Test. Like the latter it must be run under standardized conditions but is an effective procedure for determining the behavior of peroxide compositions under severe conditions.

EXAMPLE 4

Preparation of ketone peroxides.

Methyl ethyl ketone peroxide compositions were obtained by reacting 150 g. methyl ethyl ketone, 159 g. of 50% hydrogen peroxide and 115 g. of the phlegmatizer in the presence of 1.5 g. of sulfuric at 55° C. for one hour. The reaction product was dried over sodium sulfate, the unreacted methyl ethyl ketone removed by distillation. The desired concentration of methyl ethyl ketone peroxide composition was obtained by the addition of phlegmatizer.

EXAMPLE 5

The following alcohols were tested for effectiveness in suppressing explosive decomposition of methyl ethyl ketone peroxide as follows: to 100 g. of a composition of methyl ethyl ketone peroxide and dimethyl phthalate with an active oxygen content of 11.6% was added 10 g. of additive to give a final active oxygen content of 10.55%. The additive thus constitutes about 21½% of the diluent present. The TCT Test is described in Example 3. Dimethyl phthalate, water and hydrogen peroxide were run as controls.

| Additive | Boiling point, °C. | TCT test |
|---|---|---|
| tert-Butyl alcohol | 83 | Explosion. |
| tert-Pentyl alcohol | 100–3 | Do. |
| 1-butanol | 118 | Do. |
| 2-pentanol | 119 | Do. |
| 3-methyl-1-butanol | 132 | Do. |
| 1-pentanol | 138 | Do. |
| Cyclopentanol | 139–41 | Do. |
| 3-ethyl-3-pentanol | 143–4 | Do. |
| 1-hexanol | 152–4 | Fire only. |
| 3-heptanol | 155–7 | Mild explosion. |
| Cyclohexanol | 160–2 | Fire only. |
| 2-methyl-2-heptanol | 162 | Do. |
| Furfuryl alcohol | 170–3 | Do. |
| 2-octanol | 177–8 | Do. |
| 2,6-dimethyl-4-heptanol | 178–9 | Do. |
| 2-ethyl-1-hexanol | 184–91 | Do. |
| 3,4-dimethyl cyclohexanol | 190–2 | Do. |
| Benzyl alcohol | 205 | Do. |
| 1-decanol | 217–22 | Mild explosion. |
| 1-dodecanol | 255 | Do. |
| Water | 100 | Explosion. |
| Hydrogen peroxide (25%) | | Do. |
| Dimethyl phthalate | 282 | Do. |

EXAMPLE 6

The following compounds were tested as described in Example 5.

| Additive | Boiling point, °C. | TCT test |
|---|---|---|
| 3-methoxy-1-butanol | 155–64 | Mild explosion. |
| Dipropyleneglycol monomethylether | 187 | Do. |
| 2-isobutoxyethanol | 230 | Do. |
| 1-(β-butoxyethoxy)-2-propanol | 230 | Do. |
| Diethyleneglycol monobutylether | 231 | Do. |
| Diacetone alcohol | 164–6 | Fire only. |

EXAMPLE 6A

The following ketone peroxide compositions containing 2-ethyl-1-hexanol were tested by the TCT Test as described in Example 3.

Composition, percent: TCT test

Cyclohexanone peroxide, 85 ⎫ Fire.
2-ethyl-1-hexanol, 15 ⎭

Methyl ethyl ketone peroxide, 45 ⎫
Cyclohexanone peroxide, 17 ⎪ Fire.
Dimethyl phthalate, 30 ⎪
2-ethyl-1-hexanol, 8 ⎭

EXAMPLE 7

A series of methyl ethyl ketone peroxide compositions were tested by the TCT Test described in Example 3.

| Diluent | Active oxygen content, percent | Boiling point, °C. | TCT test |
|---|---|---|---|
| 3-methyl-1-butanol | 11 | 132 | Mild explosion. |
| Cyclopentanol | 11 | 139-41 | Fire. |
| Decanol | 11 | 217-222 | Do. |
| 2-ethyl-1-hexanol | 14½ | 184-91 | Do. |

EXAMPLE 8

A series of compositions of methyl ethyl ketone peroxide, dimethyl phthalate and 2 - ethyl-1-hexanol were evaluated by the PVT Test described in Example 2. This illustrates the relationship of concentration of organic peroxide, and alcohol on explosive decomposition.

| Methyl ethyl ketone peroxide, percent | Dimethyl phthalate, percent | 2-ethyl-1-hexanol, percent | PVT test 4 mm. orifice |
|---|---|---|---|
| 60 | 40 | 0 | Vails. |
| 60 | 32 | 8 | Do. |
| 60 | 24 | 16 | Do. |
| 60 | 16 | 24 | Do. |
| 60 | 14 | 26 | Passes. |
| 60 | 12 | 28 | Do. |
| 60 | 8 | 32 | Do. |
| 60 | 0 | 40 | Do. |
| 51.8 | 48.2 | | Fails. |
| 50 | 50 | | Do. |
| 49.4 | 50.6 | | Do. |
| 48.5 | 51.5 | | Passes. |
| 58.5 | 20.75 | 20.75 | Fails. |
| 56.7 | 21.65 | 21.65 | Passes. |
| 56.7 | 35.5 | 10.8 | Fails. |
| 55 | 33.75 | 11.25 | Passes. |
| 53.4 | 35 | 11.6 | Do. |

EXAMPLE 9

A series of compositions of methyl ethyl ketone peroxide, dimethyl phthalate, 2 - ethyl-1-hexanol, hydrogen peroxide and water were evaluated by the PVT Test of Example 2. The results illustrate the relation of concentration of ketone peroxide versus alcohol in compositions containing water and hydrogen peroxide on explosive decomposition.

| Methyl ethyl ketone peroxide, percent | Dimethyl phthalate, percent | 2-ethyl-1-hexanol, percent | 50% hydrogen peroxide, percent | Water, percent | PVT test 4 mm. orifice |
|---|---|---|---|---|---|
| 54.5 | 41 | | | 4.5 | Fails. |
| 54.5 | 41 | | | 4.5 | Do. |
| 54.5 | | 41 | | 4.5 | Passes. |
| 54.5 | 20.5 | 20.5 | | 4.5 | Do. |
| 54.5 | 30.75 | 10.25 | | 4.5 | Do. |
| 54.5 | 32.8 | 8.2 | | 4.5 | Fails. |
| 54.5 | 36.9 | 4.1 | | 5.0 | Do. |
| 54 | 38.4 | 4.3 | | 4.8 | Do. |
| 52.4 | 39.3 | 4.4 | | 4.7 | Do. |
| 51.6 | 41.5 | 4.6 | | 4.6 | Passes. |
| 49.3 | 43 | 4.8 | | 4.3 | Do. |
| 47.9 | 49.8 | | | 4.2 | Fails. |
| 46 | 52.5 | | | 4.1 | Passes. |
| 43.4 | | | | | |

EXAMPLE 10

The tests of Example 9 are further extended employing TCT Test of Example 3 and expanded to include cyclohexanol and a wider variation in the concentration of hydrogen peroxide.

| 63.3% methyl ethyl ketone in dimethyl phthalate, g. | Hydrogen peroxide 50% g. | 2-ethyl-1-hexanol, g. | Cyclohexanol, g. | Dimethyl phthalate, g. | TCT test |
|---|---|---|---|---|---|
| 00 | 5 | | 5 | | Fire. |
| 00 | 5 | 5 | | | Do. |
| 100 | | 10 | | | {Fire. Variable. |
| 100 | 5 | 15 | | | Fire. |
| 100 | 5 | 10 | | 5 | Do. |
| 100 | | 5 | | 5 | Mild explosion. |
| 100 | 5 | | 15 | | Fire. |
| 100 | 15 | | 25 | | Do. |
| 100 | 5.55 | | 27.9 | | Do. |

EXAMPLE 11

The following diluents were tested as described in Example 5.

| Additive | Boiling point, °C. | TCT test |
|---|---|---|
| Halogenated compounds: | | |
| Bromoethane | 40 | Explosion. |
| 1,1,1-trichloroethane | 72-8 | Do. |
| 1,1,2-trichloroethane | 114 | Do. |
| Bromoform | 150 | Do. |
| 1,2,3-trichloropropane | 156 | Do. |
| 3-chloromethylheptane | 171-3 | Variable. |
| 2-ethyl-1-chlorohexane | 174 | Do. |
| o-Dichlorobenzene | 179-83 | Explosion. |
| Chlorinated biphenyl (21%) | 275-325 | Do. |
| Chlorinated biphenyl (32%) | 290-325 | Do. |
| Ethers: | | |
| Dioxane | 101 | Explosion. |
| Dibutyl ether | 142 | Do. |
| Anisole | 154-5 | Do. |
| Phenetole | 172 | Mild explosion. |
| Diphenyl ether | 259 | Explosion. |

EXAMPLE 12

Sample of the compositions listed were stored at 110° F. for a period of 30 days and the decrease in active oxygen content determined.

| | Active oxygen content | |
|---|---|---|
| | Start, percent | 30 days, percent |
| 60% methyl ethyl ketone peroxide / 40% dimethyl phthalate | 11 | 10.9 |
| 53% methyl ethyl ketone peroxide / 30.4% dimethyl phthalate / 12.5% 2-ethyl-1-hexanol / 4.1% 50% hydrogen peroxide | 10.7 | 10.6 |

EXAMPLE 13

The polymerization initiation characteristics of several methyl ethyl ketone peroxide formulations containing alcohols effective as phlegmatizers were determined in the standard "polyester resin" of Example 1. 1% of the ketone peroxide formulation was used.

| | Gel time, minutes | Cure time [1], minutes |
|---|---|---|
| Formula A additive: | | |
| Dimethyl phthalate | 48 | 118 |
| Cyclohexanol | 49 | 122 |
| 2-ethyl-1-hexanol | 50 | 123 |
| 3-ethyl-3-pentanol | 51 | 141 |
| Cyclopentanol | 51 | 143 |
| 3,7-dimethyl-3-octanol | 58 | 188.9 |
| 1-dodecanol | 62 | 202.4 |
| Formula B additive: | | |
| Dimethyl-phthalate | 36 | 114 |
| Cyclohexanol | 34 | 121 |
| 2-ethyl-1-hexanol | 38 | 121 |
| Formula C additive: | | |
| Cyclohexanol | 35 | 96.5 |

[1] The time in minutes from gel to a reading of 10 on the medium scale Barcol Impressometer.
Formula A: 100 g. of methyl ethyl ketone peroxide in dimethyl phthalate. Active oxygen content 11.6% plus 10 g. of additive.
Formula B: 100 g. of methyl ethyl ketone peroxide in Formula A plus 5 g. of 50% hydrogen peroxide plus 15 g. of additive.
Formula C: 100 g. of methyl ethyl ketone peroxide as in Formula A plus 15 g. of 50% hydrogen peroxide plus 25 g. of additive.

We claim:
1. A nonhazardous ketone peroxide composition consisting essentially of methyl ethyl ketone peroxide in sufficient quantity to give 8.2 to 14.5% active oxygen content to said composition, not more than about 7.5% water; not more than about 40% phthalate ester plasticizer; from about 4.5 to 41% of a keto-alcohol boiling between 150° and 190° C.
2. The composition of claim 1 wherein the keto-alcohol is diacetone alcohol.
3. A nonhazardous methyl ethyl ketone peroxide composition consisting essentially of 40 to 76% methyl ethyl ketone peroxide, 1 to 7.5% hydrogen peroxide, 1 to 7.5% of water, 4.5 to 41% of an alcohol boiling between 160° and 190° C., 0 to 40% of a phthalate ester plasticizer in which the active oxygen content does not exceed 14.5% and the alcohol concentration increases with active oxygen concentration.

4. The claim of claim 3 in which the alcohol is cyclohexanol.

5. The claim of claim 3 in which the alcohol is 2-ethyl-1-hexanol.

6. The claim of claim 3 in which the alcohol is furfuryl alcohol.

7. The claim of claim 3 in which the alcohol is 2-octanol.

8. The claim of claim 3 in which the alcohol is 2-methyl-2-heptanol.

References Cited

UNITED STATES PATENTS 2,176,407  10/1939  Milas _____ 260—610
3,330,871  7/1967  Mageli et al. _____ 260—610

RICHARD D. LOVERING, Primary Examiner

I. GLUCK, Assistant Examiner

U.S. Cl. X.R.

252—99; 260—610